Nov. 23, 1926.
R. R. KEESLING
COLLAPSIBLE BED
Filed May 7, 1925
1,607,955
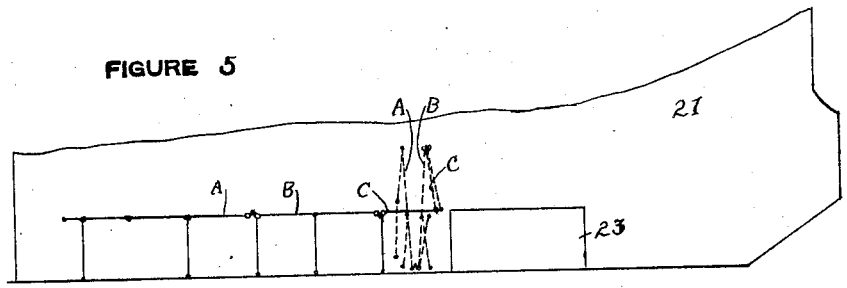
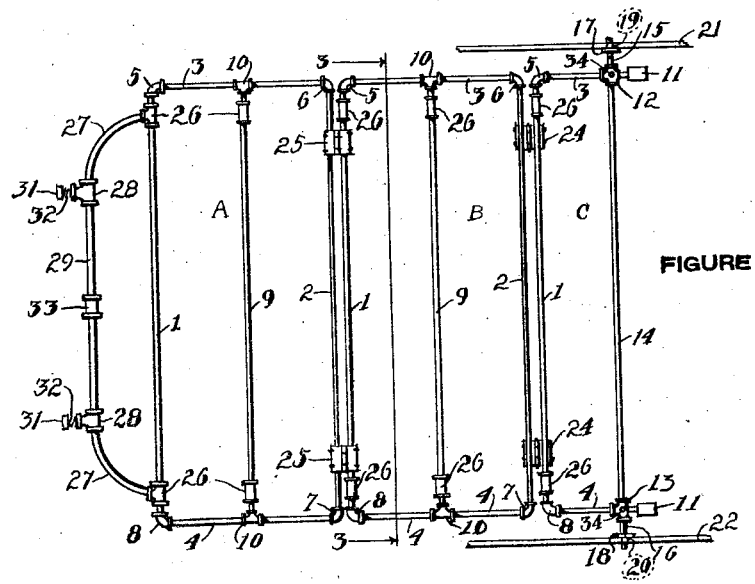
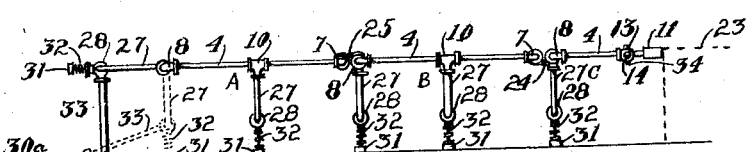
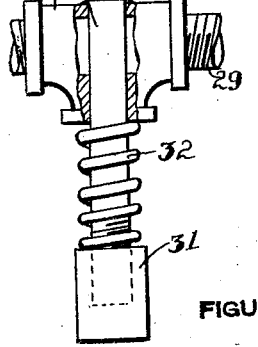
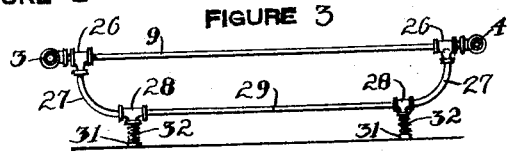
INVENTOR
Russell R. Keesling
John G. Naismith
BY
ATTORNEY Patented Nov. 23, 1926.

1,607,955

UNITED STATES PATENT OFFICE.

RUSSELL R. KEESLING, OF SAN JOSE, CALIFORNIA.

COLLAPSIBLE BED.

Application filed May 7, 1925. Serial No. 28,699.

It is one object of the invention to provide a collapsible framework so constructed and arranged as to incorporate within itself some degree of resiliency whereby to obviate the necessity of providing the usual bed springs between the mattress and the bed frame.

It is another object of the invention to provide a structure of the character indicated that may be quickly and easily mounted in an automobile body, and quickly and easily extended for use and collapsed into a small space when not in use.

It is still another object to provide a structure of the character indicated that will be economical to manufacture, simple in construction and operation, and highly efficient in its practical application.

In the drawing:—

Figure 1 is a plan view of a frame embodying my invention.

Figure 2 is a side elevation of the same.

Figure 3 is a section on line 3—3 of Figure 1.

Figure 4 is an enlarged detail of one supporting leg, partly in section.

Figure 5 is a diagrammatical illustration showing the application of the invention to an automobile body.

The device as here presented is made up largely of gas pipes and fittings, and comprises two rectangular frames "A" and "B" and a half-frame "C" with certain parts carried thereby.

Each of the frames A and B consists of parallel front and rear bars 1 and 2 joined at their ends by end bars 3 and 4 by means of elbows 5, 6, 7 and 8.

To reduce the size of the space between bars 1 and 2 and to carry supporting legs, a third bar 9 is inserted therebetween by means of T's 10 inserted in end bars 3 and 4 as shown.

The half-frame C has caps 11 threaded onto the free ends of its end bars 3 and 4, and these end bars have T parts 12 and 13 slidably mounted thereon and connected by a bar 14.

Into the outer end of the T parts 12 and 13 are threaded pins 15 and 16 fitted with nuts 17—18 so that pins 15—16 may be inserted through holes as 19—20 in the sides 21—22 of an automobile body and into the T parts 12 and 13 and thereby hold bar 14 rigidly in position in parallel relation to the seat structure 23 of the automobile body.

The frame B is hinged to the half-frame C as shown at 24 so as to break upwardly, and frame A is hinged to frame B as shown at 25 to break downwardly.

On each bar 9 and each bar 1 is pivotally mounted a T at each end as 26—26 carrying elbows 27—27 which in turn engage the T parts 28—28 connected by a bar 29. In each T 28 is slidably mounted a pin as 30 having an enlarged head 30ª and having a cap 31 screwed onto its outer end. Between cap 31 and T 28 is inserted a spring 32 so that any weight placed on bars 1 and 9 will be carried upon springs 32, thereby eliminating the hard unyielding features characteristic of this type of bed without using a thick mattress and without inserting the usual set of springs between the frame and the mattress.

These leg frames 26—32 being pivotally mounted on bars 1 and 9 quickly drop to a vertical position when the frames A—B—C are drawn out into a horizontal plane, and the bar 14 is so placed with reference to seat 23 that caps 11 engage the back of seat 23 so that when the frame is extended as shown in Figure 2 no braces are required for the legs, it being obvious that if the frames A—B—C are held against movement the legs will not be able to move.

The leg frame mounted on bar 1 of frame A has an extra leg 33 pivotally mounted on the center of bar 29 so that the bed can be extended as shown in Figure 2 if so desired.

The positions assumed by the various parts when the frame is being collapsed are clearly shown in the dotted lines in Figure 5.

When the device is assembled and in position a pin 34 is passed through each T 12 and the bars 3—4 upon which they are mounted to hold them in fixed position thereon.

It is to be understood of course, that while I have herein shown and described one specific embodiment of the invention, changes in form, construction and method of operation may be made within the scope of the appended claims.

I claim:

1. In combination, an automobile body having a seat frame therein and a folding frame extensible rearwardly of said seat frame in substantial alignment with the upper surface of said frame and foldable into substantially parallel relation to the rear surface of said seat frame said folding frame comprising two rectangular frames of equal size and having a length substantially equal to the seat frame and a width substantially double the height of the seat frame, and a third frame having a width substantially equal to the height of said seat frame, the said third frame being pivotally mounted at the upper rear edge of said seat frame, a pivotal connection between two of the longer sides of said first and second frames, a pivotal connection between one of the longer sides of said second frame and said third frame, and foldable legs carried by said frames and pivotally mounted thereon in parallel relation to the pivotal connections between the several frames.

2. The structure set forth in claim 1 including a foot frame pivotally mounted on the side of the first frame opposite its pivotal connection to the second frame, and a leg pivotally mounted on said last frame midway its ends.

3. The structure set forth in claim 1 including a foot frame pivotally mounted on the side of said first frame opposite its pivotal connection to the second frame and carrying feet whereby to form a support for said frame when angularly positioned relative thereto, and a leg pivotally mounted on said foot frame midway its ends whereby to support the same when swung into the plane of said first frame.

4. As an article of manufacture, a folding bed structure comprising two hingedly connected rectangular frames, each comprising parallel side bars and end bars and a supporting bar connecting said ends bars midway their length, and legs pivotally mounted on said supporting bars, legs pivotally mounted on one of said frames on the side adjacent to the other frame, a half-frame hingedly connected to one of said rectangular frames on the side remote from the hinged connection between said frames, a pivotal support for said half-frame and legs pivotally mounted on said half-frame on the side adjacent to the last mentioned rectangular frame, and a foot frame pivotally mounted on the side of the other frame remote from its hinged connection to the last mentioned rectangular frame and movable into parallel or angular relation to the plane of said frames, and supporting means for the same in both positions.

RUSSELL R. KEESLING.